Feb. 7, 1939.   H. BARTELS   2,145,914
POLARIZING FILTER STRUCTURE
Filed Jan. 24, 1938
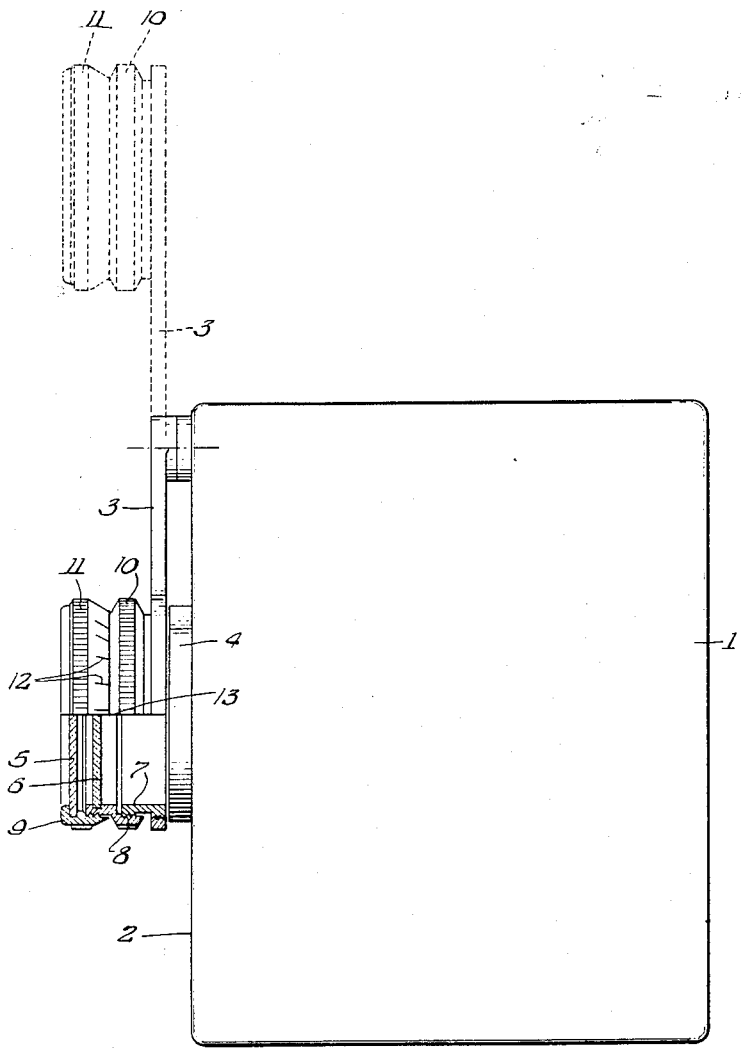
Inventor
Heinrich Bartels
BY B. Singer
Atty Patented Feb. 7, 1939

2,145,914

UNITED STATES PATENT OFFICE 2,145,914

POLARIZING FILTER STRUCTURES

Heinrich Bartels, Dresden-Laubegast, Germany, assignor to Zeiss Ikon Aktiengesellschaft, Dresden, Germany Application January 24, 1938, Serial No. 186,593
In Germany February 3, 1937

6 Claims. (Cl. 95—64)

The invention relates to improvements in polarizing filter structures for photographic purposes.

It has been proposed heretofore to employ a light diminishing or dimming device consisting of an analyzer and a polarizer instead of, or even combined with, the customary diaphragm device for an objective used for exposing and projecting of lens screen films. This diminishing device has the advantage that it is the equivalent of stopping down the objective without changing the effective area of its aperture, a condition which is very desirable particularly when exposing lens screen films. Another advantage is that this type of diminishing device may be used for all intensities of illumination within practically useful limits.

In color photography it is now desirable not only to stop down the objective without changing the effective aperture, but also to eliminate at the same time any disturbing reflection effects which may be present in the object to be photographed. In order to accomplish these two objects it ordinarily is necessary to employ two different devices, namely 1. A diminishing device consisting of a polarizer and an analyzer, and
2. A polarizing filter which is rotatably arranged in the path of the light entering the camera.

It is now an object of the present invention to provide a single device which accomplishes both results, namely stopping down the objective, and eliminating light reflections from the object to be photographed.

It has been discovered that the light diminishing device at the same time may be used for eliminating light reflections. For this purpose it is necessary that the light diminishing device consisting of a polarizer and an analyzer which are relatively rotatable to each other, are adapted to be rotated as a unit in the path of light of the camera objective, which may be attached to a motion picture camera or a still camera. Owing to this arrangement it is then possible to employ one and the same device for stopping down the objective and for eliminating the reflections, whereby the two effects may be adjusted independently of each other and the degree of light diminishing be varied independently of the degree of elimination of reflections.

In the drawing:

The figure is a side elevation view of a camera provided with a combined light diminishing and light reflection eliminating device, shown partly in axial section.

The camera 1, which may be a motion picture camera or a still camera, has pivotally attached on its front wall 2 a holder 3 which supports a light diminishing device in front of the camera objective 4. The light diminishing device is composed of a polarizer 5 and an analyzer 6.

The holder 3 has secured thereto a short barrel 7, the outer end of which has rotatably attached thereto by means of a thread a mounting ring 8 in which said analyzer 6 is fixedly secured. The mounting ring 8 in turn supports rotatably, also by a thread, a mounting ring 9 in which said polarizer 5 is fixedly secured. The outer circumferences of the rotatable mounting rings 8 and 9 are knurled as indicated at 10 and 11 respectively. The mounting ring 9 is provided with gradations 12 cooperating with a mark 13 on the mounting ring 8. The degree of diminishment of light is adjusted by rotating the mounting rings 8 and 9 relatively to each other.

Both mounting rings 8 and 9 may be rotated as a unit about the axis of the camera objective 4 by rotating the mounting ring 8 relatively to the barrel 7 for adjusting the polarizing plane of the polarizer 2 or of the combination in order to eliminate disturbing reflections. Both the analyzer 6 and the polarizer 5 are supported by the holder 3 which may be swung about an axis parallel to the axis of the camera lens into the position indicated in dotted lines. In the latter position the analyzer 6 and the polarizer 5 are in an observation position, in which the photographer is able to view the object to be photographed through the combined filters and to adjust the same to the desired degree of light diminishment and reflection elimination. After the filters 5 and 6 have been adjusted they are again swung in front of the camera objective 4. If desired, the filters may be swung for observation and adjustment into the path of light of a finder associated with the camera.

Obviously, the holder 3 may be replaced by another member accomplishing the same purpose. The filters 5 and 6 may be combined with color filters and may also be mounted and rotatably adjusted by means of other constructions. Therefore the invention is not limited to the embodiment illustrated and described, but various other forms may be adopted within the scope of the claims.

What I claim is:

1. In combination with a photographic objective, a light diminishing device including an analyzer and a polarizer in axial alinement with each other and with said objective, means for rotatably adjusting said analyzer and said polarizer relatively to each other about the axis of said objective, and means for rotatably adjusting said analyzer and polarizer simultaneously as a unit with respect to said photographic objective about the axis of the latter said last named means having said analyzer rigidly connected thereto and rotatably supporting said first mentioned means used for rotatably adjusting said analyzer and polarizer to each other.

2. In combination with a camera having a photographic objective, a light diminishing device including an analyzer and a polarizer arranged in axial alinement with each other, means for rotatably adjusting said analyzer and polarizer relatively to each other about their common axis, means for rotatably adjusting said analyzer and polarizer simultaneously as a unit about their common axis, and a carrier member pivotally attached to said camera and supporting said light diminishing device for moving the latter selectively in axial alinement with said photographic objective and into a position in which the axis of said light diminishing device is parallel to the axis of said objective for permitting an observation of the object to be photographed through said axially alined analyzer and polarizer.

3. In combination with a camera having a photographic objective, a light diminishing device including an analyzer and a polarizer arranged in axial alinement with each other, means for rotatably adjusting said analyzer and polarizer relatively to each other about their common axis, means for rotatably adjusting said analyzer and polarizer simultaneously as a unit about their common axis, and means pivotally attached to said camera and supporting said light diminishing device for moving the latter selectively in axial alinement with said photographic objective and into a position permitting an observation of the object to be photographed through said axially alined analyzer and polarizer, said last named means comprising a carrier arm pivotally attached with one end to the camera and rotatable about an axis parallel to the axis of said photographic objective, the other end of said carrier arm having said light diminishing device rotatably attached thereto about an axis parallel to the pivot axis of said carrier arm.

4. In combination with a camera having a photographic objective, a light diminishing device including an analyzer and a polarizer arranged in axial alinement with each other, means for rotatably adjusting said analyzer and polarizer relatively to each other about their common axis, means for rotatably adjusting said analyzer and polarizer simultaneously as a unit about their common axis, and means pivotally attached to said camera and supporting said light diminishing device for moving the latter selectively in axial alinement with said photographic objective and into a position permitting an observation of the object to be photographed through said axially alined analyzer and polarizer, said last named means comprising a carrier arm pivotally attached at one end to the camera and rotatable about an axis parallel to the axis of said photographic objective, the other end of said carrier arm having said analyzer adjusting means rotatably attached thereto about an axis parallel to the said pivot axis of said carrier arm, said analyzer means in turn having rotatably attached thereto said polarizer adjusting means.

5. In combination with a camera having a photographic objective, a light diminishing device including an analyzer and a polarizer arranged in axial alinement with each other, means for rotatably adjusting said analyzer and polarizer relatively to each other about their common axis, means for rotatably adjusting said analyzer and polarizer simultaneously as a unit about their common axis, and means pivotally attached to said camera and supporting said light diminishing device for moving the latter selectively in axial alinement with said photographic objective and into a position laterally of said camera for permitting an observation of the object to be photographed from behind the camera through said axially alined analyzer and polarizer, said last named means comprising a carrier arm pivotally attached at one end to the camera and rotatable about an axis parallel to the axis of said photographic objective, the other end of said carrier arm having said analyzer adjusting means rotatably attached thereto about an axis parallel to the said pivot axis of said carrier arm, said analyzer adjusting means in turn having rotatably attached thereto said polarizer adjusting means.

6. In combination with a camera having a front wall on which is mounted a photographic objective, a light diminishing device including an analyzer and a polarizer arranged in axial alinement with each other, a carrier arm for said light diminishing device pivotally mounted on said front wall about an axis parallel to the axis of said photographic objective, said carrier arm being provided for moving the light diminishing device carried by the same selectively in axial alinement with said photographic objective and into a position laterally of the camera for permitting an observation of the object to be photographed through said axial alined analyzer and polarizer, means for rotatably adjusting said light diminishing device as a unit with respect to said carrier arm about an axis coincident with the axis of said photographic objective when said light diminishing device is in axial alinement with said photographic objective, and means supported by said last named adjusting means for rotatably adjusting said analyzer and polarizer relatively to each other about their common axis.

HEINRICH BARTELS.